US010920436B2

(12) United States Patent
Olsson (10) Patent No.: US 10,920,436 B2
(45) Date of Patent: Feb. 16, 2021

(54) ARRANGEMENT AND METHOD FOR OPERATING A HYDRAULICALLY OPERATED BOOM CARRYING A TOOL IN A CARRIER (71) Applicant: HUSQVARNA AB, Huskvarna (SE)

(72) Inventor: Tommy Olsson, Mölndal (SE)

(73) Assignee: HUSQVARNA AB, Huskvarna (SE)

( * ) Notice: Subject to any disclaimer, the term of this patent is extended or adjusted under 35 U.S.C. 154(b) by 222 days.

(21) Appl. No.: 16/308,033

(22) PCT Filed: May 17, 2017

(86) PCT No.: PCT/SE2017/050520
§ 371 (c)(1),
(2) Date: Dec. 7, 2018

(87) PCT Pub. No.: WO2017/213572
PCT Pub. Date: Dec. 14, 2017

(65) Prior Publication Data
US 2019/0257100 A1 Aug. 22, 2019

(30) Foreign Application Priority Data
Jun. 9, 2016 (SE) .................... 1650807-9

(51) Int. Cl.
E04G 23/08 (2006.01)
G05D 1/00 (2006.01)
(Continued)

(52) U.S. Cl.
CPC ............ E04G 23/081 (2013.01); E02F 9/265 (2013.01); G05D 1/0011 (2013.01); E02F 3/437 (2013.01);
(Continued)

(58) Field of Classification Search
CPC ........ E04G 23/081; E02F 9/265; E02F 3/437; E02F 9/2271; E02F 9/2203; G05D 1/0011; G05D 2201/0202
See application file for complete search history.

(56) References Cited

U.S. PATENT DOCUMENTS 8,428,791 B2 * 4/2013 Carlsson .................. G05G 1/02
701/2
9,086,241 B2 * 7/2015 Bystedt ................. E02F 3/3681
(Continued)

FOREIGN PATENT DOCUMENTS

CN 101932774 A 12/2010
EP 00736634 A1 10/1996
(Continued)

OTHER PUBLICATIONS

International Search Report and Written Opinion for International Application No. PCT/SE2017/050520 dated Jul. 28, 2017.
(Continued)

Primary Examiner — Peter D Nolan
Assistant Examiner — Wae L Louie
(74) Attorney, Agent, or Firm — Burr & Forman, LLP (57) ABSTRACT A carrier comprising at least a first hydraulic cylinder and a second hydraulic cylinder both having each a piston and a piston position sensor, wherein the carrier is arranged to carry a tool through the use of the hydraulic cylinders and wherein the controller is configured to: receive control information to move the tool in a direction along a working line; receive position information for the first cylinder; receive position information for the second cylinder; determine if the working line for the tool is maintained, and, if the working line is not maintained, then adapt for the movement of the first cylinder by providing control of the second
(Continued)

cylinder to maintain the working line for the tool and thereby feeding the tool along the working line.

15 Claims, 5 Drawing Sheets (51) Int. Cl.
*E02F 9/26* (2006.01)
*E02F 9/20* (2006.01)
*E02F 9/22* (2006.01)
*E21B 7/02* (2006.01)
*E02F 3/43* (2006.01)

(52) U.S. Cl.
CPC ............. *E02F 9/205* (2013.01); *E02F 9/2203* (2013.01); *E02F 9/2271* (2013.01); *E21B 7/022* (2013.01); *G05D 2201/0202* (2013.01)

(56) References Cited

U.S. PATENT DOCUMENTS

| | | | | |
|---|---|---|---|---|
| 9,546,672 | B2* | 1/2017 | Perkins | F15B 15/2815 |
| 10,681,865 | B2* | 6/2020 | Dunn | A01D 41/141 |
| 2004/0136821 | A1* | 7/2004 | Berger | E02F 3/433 |
| | | | | 414/699 |
| 2006/0007144 | A1 | 1/2006 | Mathiasen et al. | |
| 2009/0108663 | A1* | 4/2009 | Berning | E01C 23/088 |
| | | | | 299/1.5 |
| 2009/0198382 | A1* | 8/2009 | Koch | E02F 3/432 |
| | | | | 700/275 |
| 2014/0166362 | A1 | 6/2014 | Farmer et al. | |
| 2016/0025114 | A1* | 1/2016 | Perkins | F15B 11/048 |
| | | | | 91/51 |
| 2016/0075013 | A1* | 3/2016 | Toyoda | B25J 9/163 |
| | | | | 700/245 |
| 2017/0247851 | A1* | 8/2017 | Hickson | E02F 9/2267 |
| 2017/0362784 | A1* | 12/2017 | Hoffmann | E01C 23/088 |
| 2019/0113057 | A1* | 4/2019 | Olsson | E02F 3/966 |
| 2019/0161944 | A1* | 5/2019 | Olsson | E02F 9/2246 |
| 2019/0226721 | A1* | 7/2019 | Dl Giannatale | F24S 50/00 |
| 2019/0234043 | A1* | 8/2019 | Nygren | E02F 3/3654 |
| 2019/0257100 | A1* | 8/2019 | Olsson | E02F 9/265 |
| 2020/0045868 | A1* | 2/2020 | Wu | A01B 63/111 |
| 2020/0077585 | A1* | 3/2020 | Garbald | A01B 63/008 |
| 2020/0146496 | A1* | 5/2020 | Patadia | A47J 44/00 |
| 2020/0198943 | A1* | 6/2020 | Konigsson | B66C 23/80 |

FOREIGN PATENT DOCUMENTS

| | | |
|---|---|---|
| EP | 2 508 680 A1 | 10/2012 |
| EP | 2 589 709 A2 | 5/2013 |
| GB | 2 527 598 A | 12/2015 |
| SE | 536152 C2 | 6/2013 |
| WO | 2012/060773 A1 | 5/2012 |

OTHER PUBLICATIONS

Swedish Office Action and Search Report for Swedish Application No. 1650807-9, dated Jan. 19, 2017.
International Preliminary Report on Patentability for International Application No. PCT/SE2017/050520 dated Dec. 11, 2018.

* cited by examiner

ARRANGEMENT AND METHOD FOR OPERATING A HYDRAULICALLY OPERATED BOOM CARRYING A TOOL IN A CARRIER

TECHNICAL FIELD

This application relates to the operation of hydraulic booms or arms, and in particular to improved operation of hydraulic cylinders used to operate arms carrying construction or demolition tools used in carriers.

BACKGROUND

When aligning a working tool carried by a hydraulically operated boom or arm of a carrier it can be difficult for an operator to set a tool, such as a hydraulic hammer (breaker) or drill, at the correct angle, which is most often perpendicular to the surface of the subject to be treated. This is due to the fact that the operator is mostly not positioned next to the tool for reasons of safety and convenience, the operator often standing behind or next to the tool or sitting in a driver's cabin.

Furthermore, it may be even more difficult for an operator to hold a steady angle as well as height, in other words to hold a steady working line when moving the tool when the work progresses, i.e. as the tool moves forwards while engaging the surface or subject to be treated.

Figure 5A:
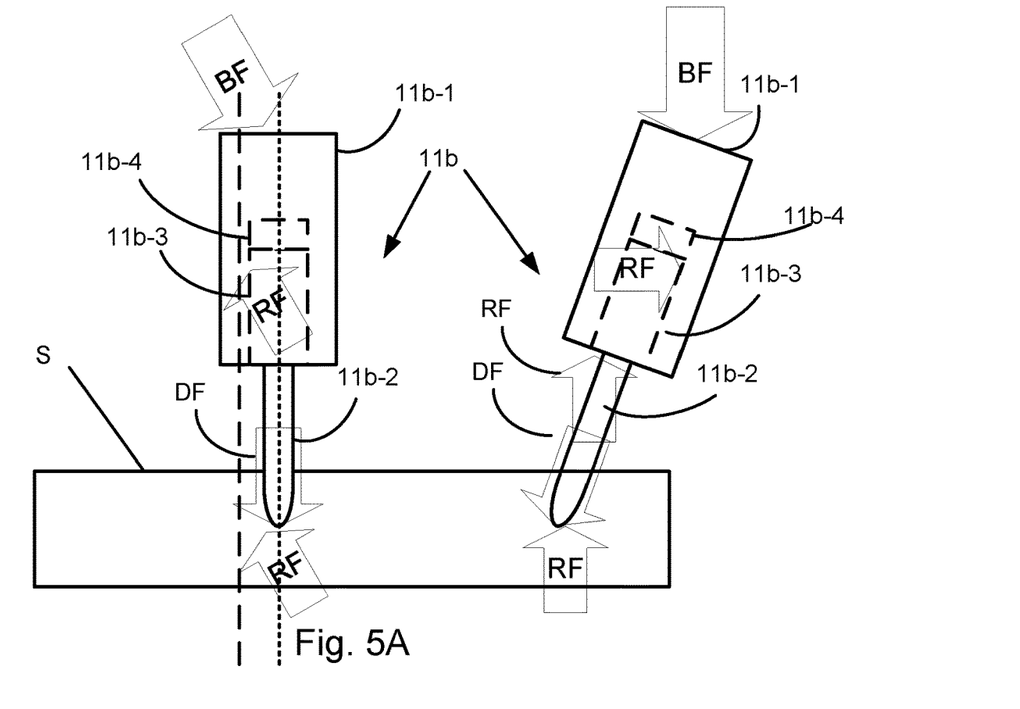
FIG. 5A shows a schematic view of a tool arranged on a hydraulically operated arm engaging a subject at an incorrect angle according to a prior art solution.

It is important that a tool engages a subject at a correct angle or the load exerted on the tool may be at an angle impeding the operation of the tool. For example, if a hydraulic hammer or drill engages a concrete wall at an angle that is not right and perpendicular to the subject, wherein the power exerted on the hammer by the boom is straight and perpendicular to the subject, the resulting forces in the tool will be at an angle which may cause damage to or increased wear of for example bushings of the tool. FIG. 5A illustrates the problem.

Especially for drills it is important that the drilled hole extends straight in and along a straight line and preferably at right angle to the subject being drilled.

Also, should for example a tool be moved forwards by maneuvering one or more cylinders, the tool may not be maintained at a same level which causes further stress to the tool.

Prior art solutions provide for maintaining a previously set angle, such as a previously moved to angle, or to set an alignment angle automatically. However, the manner of maintaining an angle does not solve how to set the angle correctly the first time, and the manner of automatically setting the angle takes away the control of the boom from the operator and may cause unexpected movement of the boom, thereby possibly endangering operators or bystanders. Also, none of the prior art solutions, address the solution to the problems realized by the inventors, namely that the tool need to be moved along a straight line to or the subject being treated and/or the tool may suffer damages or be treated unevenly.

There is thus a need for an alternative or additional solution for overcoming the drawbacks of the prior art, namely to provide proper feeding of a carrier such as a construction/demolition tool.

SUMMARY

One object of the present teachings herein is to solve, mitigate or at least reduce the drawbacks of the background art, which is achieved by the appended claims.

A first aspect of the teachings herein provides for a carrier comprising a controller, at least a first hydraulic cylinder and a second hydraulic cylinder both having each a piston and a piston position sensor, wherein the carrier is arranged to carry a tool through the use of the hydraulic cylinders and wherein the controller is configured to: receive control information for controlling at least one of the first and a second hydraulic cylinder to move the tool in a direction along a working line; receive position information for the first hydraulic cylinder; receive position information for the second hydraulic cylinder; determine if the working line for the tool is maintained, and, if the working line is not maintained, then adapt for the movement of said at least one of the first and the second hydraulic cylinder by providing control of at least the other of the first and the second hydraulic cylinder to maintain the working line for the tool and thereby feeding the tool along the working line.

In one embodiment the controller is further configured to receive control information for moving the tool in a direction along the working line based on input commands from a specified command control for moving the tool in a direction along the working line, the command control being comprised in the carrier.

A second aspect provides a method for use in a at least a first hydraulic cylinder and a second hydraulic cylinder both having each a piston and a piston position sensor, wherein the carrier is arranged to carry a tool through the use of the hydraulic cylinders and wherein the method comprises: receiving control information for controlling at least one of the first and a second hydraulic cylinder to move the tool in a direction along a working line; receiving position information for the first hydraulic cylinder; receiving position information for the second hydraulic cylinder; determining if the working line for the tool is maintained, and, if the working line is not maintained, then adapting for the movement of said at least one of the first and the second hydraulic cylinder by providing control of at least the other of the first and the second hydraulic cylinder to maintain the working line for the tool and thereby feeding the tool along the working line.

In one embodiment the method further comprises receiving control information for moving the tool in a direction along the working line based on input commands from a specified command control for moving the tool in a direction along the working line, the command control being comprised in the carrier.

It should be noted that even though the disclosure herein is focused on hydraulically operated booms and arms, the inventors have realized that the teachings herein may also be used for booms or arms operated in different manners, such as pneumatically or mechanically. The inventors have further realized that the position locators of the cylinders may also be used with such pneumatic or mechanical control wherein the position of an arm member may be determined in a corresponding fashion.

Other features and advantages of the disclosed embodiments will appear from the following detailed disclosure, from the attached dependent claims as well as from the drawings.

BRIEF DESCRIPTION OF DRAWING

The invention will be described below with reference to the accompanying figures wherein.

DETAILED DESCRIPTION

Figure 1:
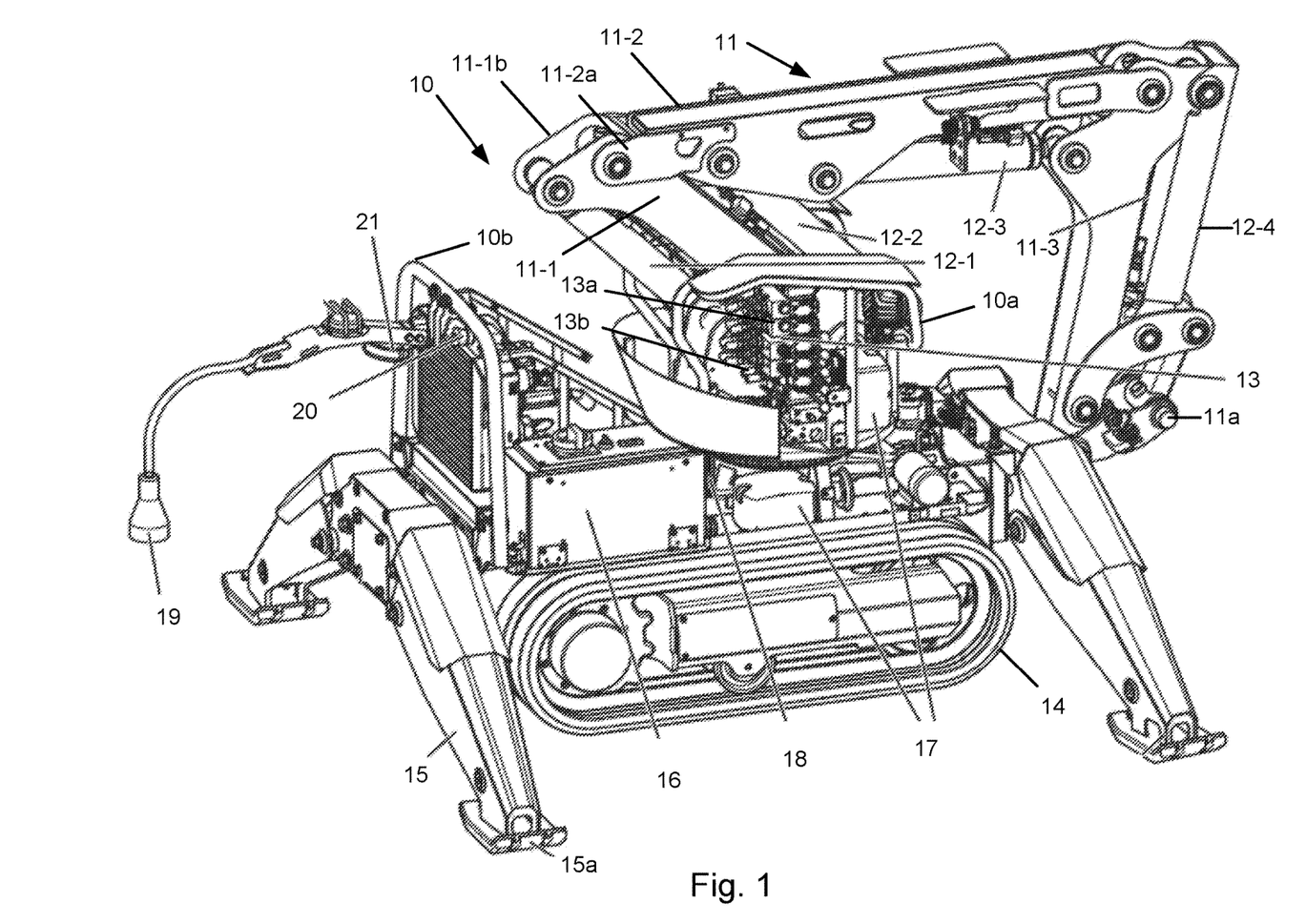
FIG. 1 shows a remote demolition robot according to an embodiment of the teachings herein.

FIG. 1 shows an example of carrier for a work tool, such as a construction tool or demolition tool for example a hammer (breaker) or a drill, which carrier in this example is a remote demolition robot 10, hereafter simply referred to as the robot 10. Although the description herein is focused on demolition robots, the teachings may also be applied to any engineering vehicle arranged to carry a tool, on an arm or boom system which is hydraulically controlled. In the following no difference will be made between a boom and an arm.

The robot 10, exemplifying the carrier, comprises one or more robot members, such as arms 11, but only one arm is shown in the figures of this application. The arm 11 possibly constitutes one (or more) robot arm member(s). One member may be a tool holder 11a for holding a tool 11b (not shown in FIG. 1, see FIG. 3). The tool 11b may be a hydraulic breaker (hammer) or a drill. Other examples of tools for which the working line is important are cutters, excavation buckets, saws, a concrete rotary breaker or steel shearers to mention a few examples.

At least one of the arms 11 is movably operable through at least one hydraulic cylinder 12. The hydraulic cylinders are controlled through a hydraulic valve block 13 housed in the robot 10.

The hydraulic valve block 13 comprises one or more valves 13a for controlling the flow of a hydraulic fluid (oil) supplied to for example a corresponding cylinder 12.

The robot 10 comprises caterpillar tracks 14 that enable the robot 10 to move. The robot 10 may alternatively or additionally have wheels for enabling it to move, both wheels and caterpillar tracks being examples of drive means. The robot may further comprise outriggers 15 that may be extended individually (or collectively) to stabilize the robot 10.

The robot 10 is driven by a drive system 16 operably connected to the caterpillar tracks 14 and the hydraulic valve block 13. The drive system 16 may comprise an electrical motor in case of an electrically powered robot powered by a battery and/or an electrical cable 19 connected to an electrical grid (not shown), or a cabinet for a fuel tank and an engine in case of a combustion powered robot 10.

The body of the robot 10 may comprise a tower 10a on which the arms 11 are arranged, and a base 10b on which the caterpillar tracks 14 are arranged. The tower 10a is arranged to be rotatable with regards to the base 10b which enables an operator to turn the arms 11 in a direction other than the direction of the caterpillar tracks 14.

In detail, the arm 11 is arranged to carry the tool 11b (not shown) and comprises a first arm member 11-1, a second arm member 11-2, a third arm member 11-3 and a tool holder 11a. The arm members 11-1, 11-2, 11-3 and 11a are pivotally coupled to each other so that the arm 11 is articulated. One end (not shown) of the first arm member 11-1 is pivotally coupled to the carrier, e.g. to the tower 10a and the other end 11-1b is pivotally attached to an end 11-2a of the second arm member 11-2. Pivotal coupling between arm members and carrier may be provided by pivot shafts. It is appreciated that the third arm member 11-3 may be omitted whereby the tool 11b (not shown) may be directly coupled to the second arm member 11-2. Alternatively, the tool holder 11a may be directly coupled to the second arm member 11-2. It is also possible that the second arm member 11-2 is constituted by the tool holder 11a.

The carrier further comprises a first and a second hydraulic cylinder 12-1 and 12-2. The first hydraulic cylinder 12-1 is arranged to move the first arm member 11-1. That is, arranged to pivot the first arm member 11-1 around the pivotal coupling to the carrier. One end of the first hydraulic cylinder 12-1 (e.g. the end of the cylinder barrel) is thereby pivotally coupled to the carrier 10 and another end of the first hydraulic cylinder 12-1 (e.g. the end of the piston rod) is pivotally coupled to the end 11-1b of the first arm member 11-1. The second hydraulic cylinder 12-2 is arranged to move the second arm member 11-2. That is, to move the second arm member 11-2 around the pivotal coupling to the first arm member 11-1. One end of the second hydraulic cylinder 12-2 is thereby pivotally coupled to the carrier 10 and the other end of the second hydraulic cylinder 12-2 is pivotally coupled to the end 11-2a of the second arm member 11-2. A third hydraulic cylinder 12-3 may be arranged to move the third arm member 11-3 and a fourth hydraulic cylinder 12-4 may be arranged to move the tool holder 11a or the tool (not shown).

Thus, in the exemplary embodiment of FIG. 1, when the first hydraulic cylinder 12-1 is extended, the first arm member 11-1 is pivoted clockwise in a forward direction. When the first hydraulic cylinder 12-1 is retracted the first arm member 11-1 is pivoted counter-clockwise in a backward direction. When the second hydraulic cylinder 12-2 is extended, the second arm member 11-2 is pivoted counter-clockwise in an upwards direction. When the second hydraulic cylinder 12-2 is retracted the second arm member 11-2 is pivoted clockwise in a downwards direction.

The operation of the robot 10 is controlled by one or more controllers 17 comprising at least one processor or other programmable logic and possibly a memory module for storing instructions that when executed by the at least one processor or other programmable logic controls a function of the demolition robot 10. The one or more controllers 17 will hereafter be referred to as one and the same controller 17 making no differentiation of which processor is executing which operation. It should be noted that the execution of a task may be divided between the controllers wherein the controllers will exchange data and/or commands to execute the task.

The robot 10 comprises a control interface 22 which may be a remote control (see FIG. 2), but may also be an arrangement of levers, buttons and possibly steering wheels as would be understood by a person skilled in the art.

The robot 10 may further comprise a radio module 18. The radio module 18 may be used for communicating with the remote control (see FIG. 2, reference 22) for receiving commands to be executed by the controller 17. The radio module may be configured to operate according to a low energy radio frequency communication standard such as ZigBee®, Bluetooth® or WiFi®. Alternatively or additionally, the radio module 18 may be configured to operate according to a cellular communication standard, such as GSM (Global Systeme Mobile) or LTE (Long Term Evolution).

For wired control of the robot 10, the remote control 22 may alternatively be connected through or along with the power cable 19. The robot may also comprise a Human-Machine Interface (HMI), which may comprise control buttons, such as a stop button 20, and light indicators, such as a warning light 21.

Figure 2:
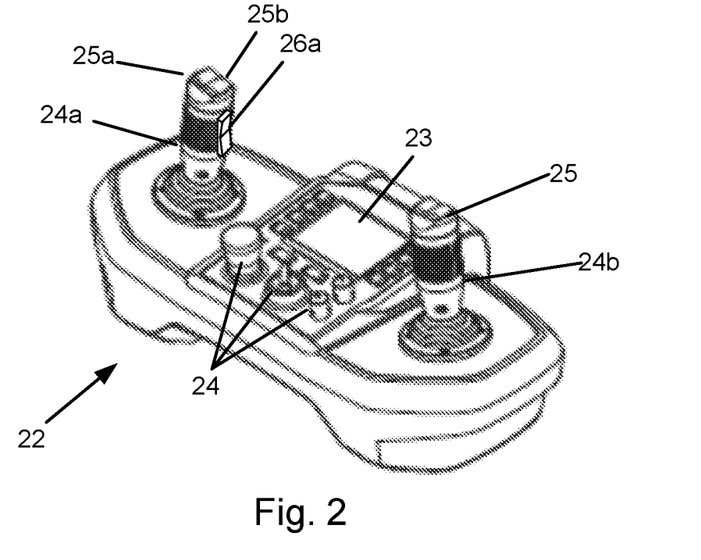
FIG. 2 shows a remote control 22 for a remote demolition robot according to an embodiment of the teachings herein.

FIG. 2 shows a remote control 22 for a remote demolition robot such as the robot 10 in FIG. 1. The remote control 22 has one or more displays 23 for providing information to an operator, and one or more controls 24 for receiving commands from the operator. The controls 24 include one or more joysticks, a left joystick 24a and a right joystick 24b for example as shown in FIG. 2, being examples of a first joystick 24a and a second joystick 24b. It should be noted that the labeling of a left and a right joystick is merely a labeling used to differentiate between the two joysticks 24a, 24b. A joystick 24a, 24b may further be arranged with a top control switch 25. The joysticks 24a, 24b and the top control switches 25 are used to provide maneuvering commands to the robot 10. The control switches 25 may be used to select one out of several operating modes, wherein an operating mode determines which control input corresponds to which action.

As touched upon in the above, the remote control 22 may be seen as a part of the robot 10 in that it may be the control panel of the robot 10.

The remote control 22 is thus configured to provide control information, such as commands, to the robot 10 which information is interpreted by the controller 17, causing the robot 10 to operate according to the actuations of the remote control 22.

Figure 3:
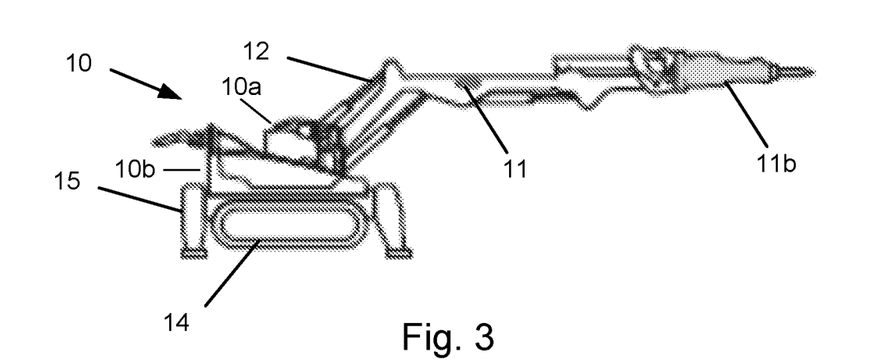
FIG. 3 shows a schematic view of a robot according to an embodiment of the teachings herein.

FIG. 3 shows a schematic view of a carrier, such as the robot 10 according to FIG. 1. In FIG. 3, the caterpillar tracks 14, the outriggers 15, the arms 11 and the hydraulic cylinders 12 are shown. A tool 11b, in the form of a hammer 11b, is also shown (being shaded to indicate that it is optional).

As the controller 17 receives input relating for example to moving a robot member 11, the corresponding valve 13a is controlled to open or close depending on the movement or operation to be made.

Figure 4:
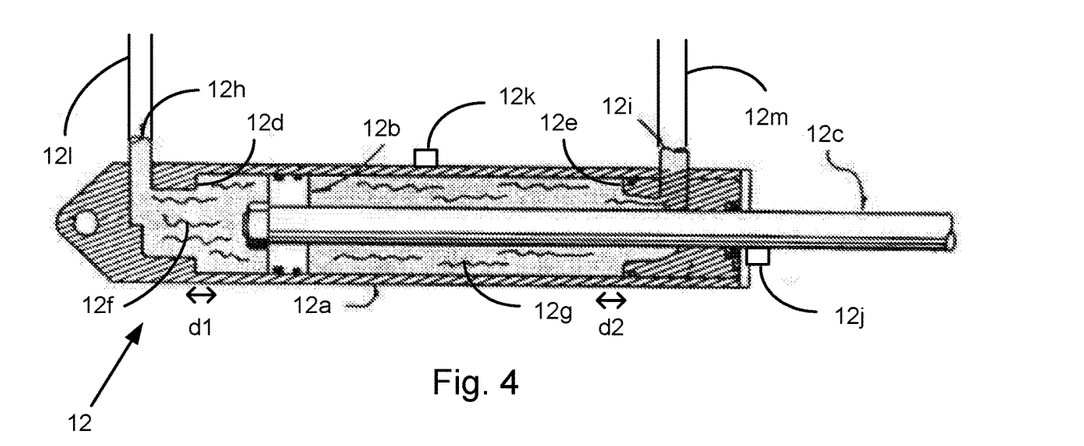
FIG. 4 shows a schematic view of a hydraulic cylinder according to an embodiment of the teachings herein.

FIG. 4 shows a schematic view of a hydraulic cylinder 12. The hydraulic cylinder 12 comprises a cylinder barrel 12a, in which a piston 12b, connected to a piston rod 12c, moves back and forth. The barrel 12a is closed on one end by the cylinder bottom (also called the cap) 12d and the other end by the cylinder head (also called the gland) 12e where the piston rod 12c comes out of the cylinder. Through the use of sliding rings and seals the piston 12b divides the inside of the cylinder 12a into two chambers, the bottom chamber (cap end) 12f and the piston rod side chamber (rod end/head end) 12g. The hydraulic cylinder 12 gets its power from a pressurized hydraulic fluid (shown as grayed out areas with wavy lines), which is typically oil, being pumped into either chamber 12f, 12g through respective oil ports 12h, 12i for moving the piston rod in either direction. The hydraulic fluid, being supplied through hydraulic fluid conduits 12l, 12m, is pumped into the bottom chamber 12f through the bottom oil port 12h to extend the piston rod 12c and into the head end through the head oil port 12i to retract the piston rod 12c.

The hydraulic cylinder 12 is further arranged with a piston position sensor 12j. Many alternatives for a piston position sensor exist being of various magnetic, optical, and/or electrical designs. The piston position sensor 12j is configured to determine the position of the piston 12b in the barrel 12a, possibly by determining the position of the piston rod 12c relative to the barrel 12a.

The piston position sensor 12j may be an integrated part of the cylinder 12, or it may be an add-on feature that is attached to or assembled on the cylinder 12. The piston position sensor 12j is communicatively connected to the controller 17 for transmitting piston position information received by the controller 17 which enables the controller 17 to determine the position of the piston 12b in the barrel 12a.

The piston position sensor 12j may also or alternatively be arranged as an angle detector between two arm members 11 that are controlled by the hydraulic cylinder 12. By knowing the angle between two arm members, the controller may determine the position of the piston as, for a fixed pivot point (around which the arm member moves), the angle will be directly proportional to the piston position.

The angle detector may also be designed to provide an absolute angle, that is the actual angle of the arm.

The inventor has realized that by knowing the position of the pistons 12b in the cylinders 12, it is possible to overcome the drawbacks of the prior art especially as regards the wear and tear of the tool which may result from an improper feeding of the tool.

The inventor proposes an intelligent manner of actively feeding a tool 11b correctly.

Returning to the problem to be solved, FIG. 5A shows a schematic view of a tool 11b being aligned incorrectly with regards to a subject S to be treated or worked upon by the tool 11b. In this example the tool 11b is represented by a schematic hammer 11b.

There are two situations illustrated in FIG. 5A. A first situation where the tool is arranged at a correct angle (perpendicular), but not moved along a straight line, is shown on the left side of FIG. 5A. And second situation is shown on the right side, where the tool is incorrectly arranged (not perpendicular) relative the surface or subject to be treated.

Figure 5B:
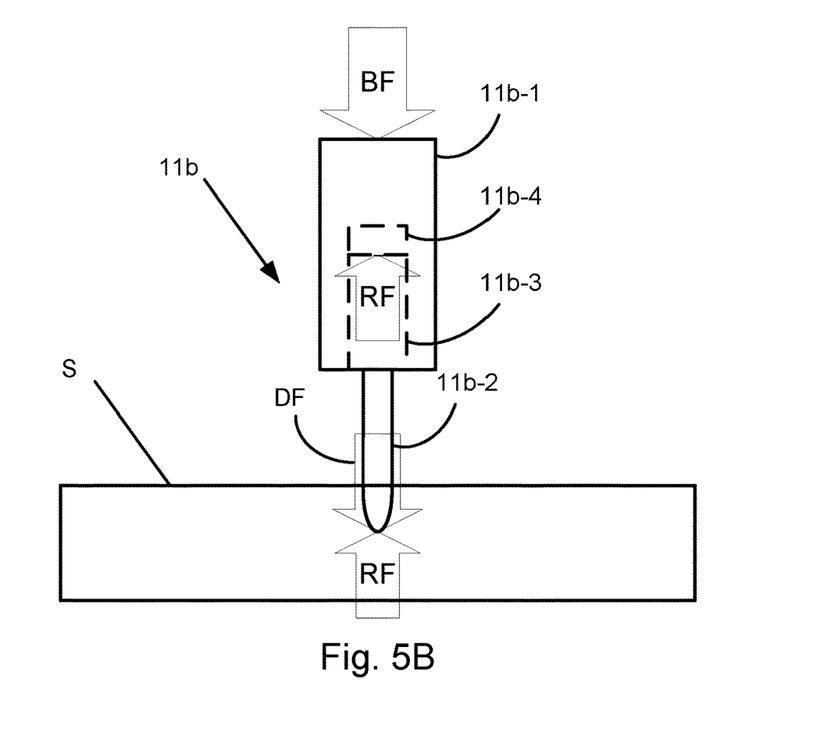
FIG. 5B shows a schematic view of tool arranged on a hydraulically operated arm engaging a subject at a correct angle according to an embodiment of the teachings herein.

As can be seen in FIG. 5A, the hammer 11b comprises a casing 11b-1 and a hammer head 11b-2. The hammer head 11b-2 is movably arranged relative the casing 11b-1 and the movement is controlled partly by bushings 11b-3 in the casing 11b-1. The hammer head 11b-2 is activated or driven by a driving element 11b-4 that is arranged to withstand (great) forces, both to deliver a driving force and to absorb any resultant forces. In FIGS. 5A and 5B such forces are indicated by arrows. The sizes of the arrows are only for illustrative purposes and the amplitude of the forces may not correspond to the size of the corresponding arrows.

During operation, the hammer 11b and the hammer head 11b-2 are subjected to a driving force DF driving the hammer head 11b-2 into the subject S to be worked upon, the subject possibly being a floor or a wall or other structural component. The hammer head 11b-2 is also subjected to a boom force BF, driving the hammer 11b towards the subject S, keeping the hammer 11b in place and possibly feeding it as the work progresses. As the hammer head 11b-2 engages the subject S, it will be subjected to a reactive force RF from the subject S. The reactive force RF is translated through the hammer head 11b-2 into the casing 11b-1 where the hammer head 11b-2 engages the bushings 11b-3. If the hammer head 11b-2 engages the subject S at an incorrect angle (that is, at an angle that is not in-line with the tool) the reactive force RF will engage the bushings at locations/positions where the bushing and the hammer in general is not designed to absorb or handle the reactive forces which will lead to increased wear and tear of the hammer, a reduced efficiency of the hammer and also possibly risking damaging the hammer, drill or other tool.

Furthermore, should the horizontal level or height (when operating at a horizontal level) or the vertical level (when operating at a vertical level) of the tool change, the tool will be subjected to further forces, namely that of the boom force BF pushing the tool away from the intended working line and the reactive force RF exerted by the subject. In other words, if the tool is pushed off its intended working line (pushed to one side) it will be subjected to further forces. The intended working line, being the line along which the tool is intended to be moved, is indicated by the dashed line, whereas the actual working line is indicated by dotted lines. These forces, both serve to increase the wear and tear of the tool, as well as decrease its efficiency.

FIG. 5B shows a schematic view of a similar scenario, but here the tool 11$b$ is aligned at a correct angle and maintained at a same level, in this case being perpendicular to the subject S and moved along the intended working line, and the reactive forces engage with the driving element 11$b$-4. The hammer head 11$b$-2 will thus be able to move freely within its bushings 11$b$-3, whereby vibrations as well as any shocks, that the tool is subjected to, will be absorbed as was intended by the designers of the tool 11$b$.

The inventor provides a manner of reducing the wear and tear of a tool, as well as the stability and smoothness of operation, by configuring the controller 17 to receive piston position information for the piston (directly or indirectly) from a piston position sensor 12$j$ and based on the piston position information, controlling the movement of the arms 11 and especially the tool holder arm for feeding the tool 11$b$ along a working line for enabling the tool 11$b$ to engage the subject S at both a desired level and angle, the level and the angle being those of the intended working line.

Figure 6:
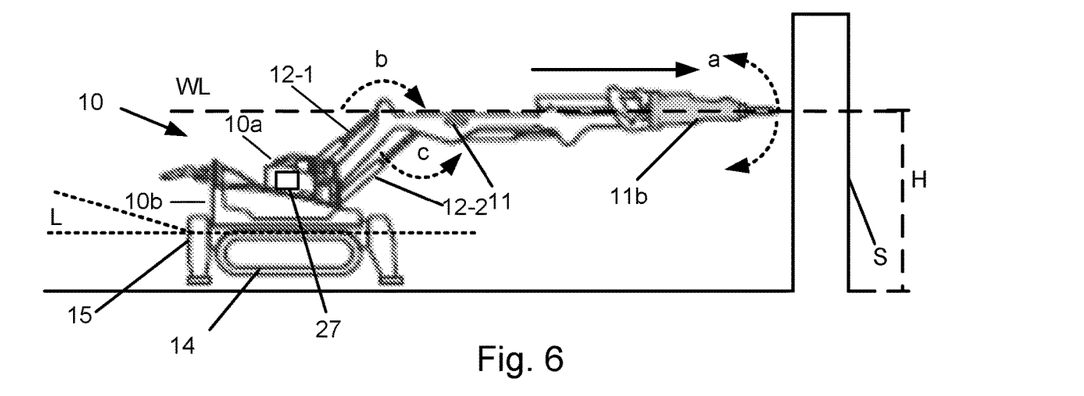
FIG. 6 shows a schematic view of tool arranged on a hydraulically operated arm engaging a subject according to an embodiment of the teachings herein.

FIG. 6 shows a schematic view of a demolition robot, as an example of a carrier 10, having a hammer, as an example of a tool 11$b$, engaging a wall, as an example of a subject to be worked upon.

A direction or angle and level perpendicular to the subject S is indicated by a dashed line in FIG. 6, thereby indicating a desired working line at a height or distance H from a reference level, in this case the ground.

An operator may maneuver the arms 11 and the tool 11$b$ with respect to the subject S and thereby change the angle a and/or the level H at which the tool 11$b$ engages the subject S. As has been discussed in the above it may be difficult for an operator to see when the tool is aligned at the correct angle and also to control the operation of the arm 11 so that a level is maintained.

As can be seen in FIG. 6, the arm has a first cylinder 12-1 and a second cylinder 12-2. By increasing the angle b for the first cylinder 12-1 will result in the tool 11$b$ being moved downwards (in the example situation of FIG. 6). Even if the correct angle was maintained by the tool 11$b$, the level would now be changed. Any movement of any cylinder must therefore be compensated for by at least one other cylinder. In the example of FIG. 6, if the first cylinder 12-1 is manipulated to bring the tool 11$b$ forwards, the second cylinder 12-2 must also and simultaneously be manipulated to compensate for the movement of the first cylinder and thereby the arm 11, by increasing the angle c of the second cylinder 12-2 thereby raising the arm 11. As a skilled person would realize, simultaneous manipulation of other cylinders may also be necessary to maintain a level and angle, constituting the working line WL. The compensation may be simultaneous for a smoother operation, or subsequent for allowing more time to process positional information taking one step (or more) at a time.

The controller is therefore configured to receive control information to move the tool 11$b$ and to receive position information for the first cylinder 12-1 and determine if a working line WL for the tool is maintained. If the line would not be maintained, the controller is further configured to receive position information for the second cylinder 12-2 and to compensate for the movement of the first cylinder 12-1 by providing control of the second cylinder 12-2 to maintain the working line (level and angle (or direction)) for the tool 11$b$ and thereby feeding the tool along the working line WL.

The controller may be configured to receive control information for moving the tool 11$b$ as control information for an individual cylinder—or a plurality of cylinders, whereby the controller adapts the control of the cylinders to compensate for such control information should the control information not result in the tool being fed along the working line possibly not only adapting the angle a for the tool 11$b$, but also the level through adapting the angles (or lengths) of the first and second cylinders 12-1, 12-2.

The controller may alternatively or additionally be configured to receive control information for moving the tool 11$b$ as control information from a specified command control, such as a direction of one joystick 24$a,b$ or other command. Such a specified command corresponds to providing information that the tool 11$b$ should be fed or retracted along the working line WL—depending on the manner of actuating the control. The carrier, exemplified by the demolition robot, thus comprises a control (24,25,26) that is arranged to correspond to feeding and/or retracting the tool 11$b$ along the working line.

The controller 17 may be configured to determine that the tool 11$b$ is moved in a manner that maintains the working line WL by determining its position and angle through deducing the relative position and angle of each joint connecting an arm member to another—or to the tower. As would be understood by a person skilled in mechanical engineering of multiple jointed arms or booms, such calculations depend on the number of joints and the length of each arm member and thus vary greatly depending on the actual design chosen.

This allows the controller to automatically feed—upon operator instruction—the tool 11$b$ along the working line as indicated by the arrow of FIG. 6.

The controller may be configured to receive a command to set a working line WL, and in response thereto store the working line to be maintained.

The command to set the working line may be a specific command through one of the controls 24,25,26 whereby the controller would set the current working line (direction and level) as the working line to be maintained.

The command to set the working line may be a command through one of the controls 24,25,26 to select between previously stored (possible default) working lines whereby the controller would set the working line to be maintained to a selected working line. In such an embodiment, the controller may further be configured to move the tool 11$b$ to the working line, the working line being defined by a height or distance to a reference, and a direction or an angle.

The command to set the working line may be a command to activate the operation of the tool 11$b$, whereby the controller would set the current working line (direction and level) as the working line to be maintained.

To enable the operator to change the working line of the tool 11*b*, perhaps another level is now to be used, the operator may cancel the automatic feed by cancelling a feed mode.

Alternatively or additionally, to enable the operator to change the working line of the tool 11*b*, perhaps another level is now to be used, the operator may cancel the automatic feed by cancelling the operation of the tool 11*b*.

As has been indicated above, the controller may be configured to store more than one working line. The controller will thus act as above in the vicinity of each stored working line.

The controller may further be configured to determine a new working line to be maintained based on a previous working line to be maintained after the tool 11*b* has been moved a distance, the new working line being parallel to the previous working line, but at the new position. In such an embodiment, the controller may be configured to align the tool 11*b* along such a working line, automatically or by guiding the operator in a manner similar to that which is disclosed for guiding an operator to a desired angle in the concurrently filed application by the same inventor and applicant, entitled "IMPROVED ARRANGEMENT AND METHOD FOR OPERATING A HYDRAULICALLY OPERATED BOOM CARRYING A TOOL" disclosing a manner wherein a controller guides an operator to find a desired angle. The same system being possible to be used also for finding a level.

The working line may also be input to the controller 17 through the remote control 22 or via the radio module 18 or the HMI.

The working line may also be maintained by at least one of the first and second (or more) cylinders being manipulated according to a detected lean angle of the robot 10. This is especially useful when aligning the tool 11*b* according to a previously stored working line.

The robot 10 may be arranged with a lean sensor 27, such as a gyroscope, for detecting an angle L that the body 10*a*/10*b* of the robot 10 is currently at. This lean angle L provides for a base line (indicated by a dotted line in FIG. 6) for adapting any angle of a cylinder 12 for maintaining the previously stored working line, even when the robot 10 is not placed level. The controller 17 is thus configured to receive a lean angle (L) reading from a lean sensor 27, and to adapt the current angle b,c of the tool 11*b* or any cylinder 12 accordingly for maintaining the working line.

The lean angle L may alternatively or additionally be derived from the position of the outriggers 15.

Figure 7:
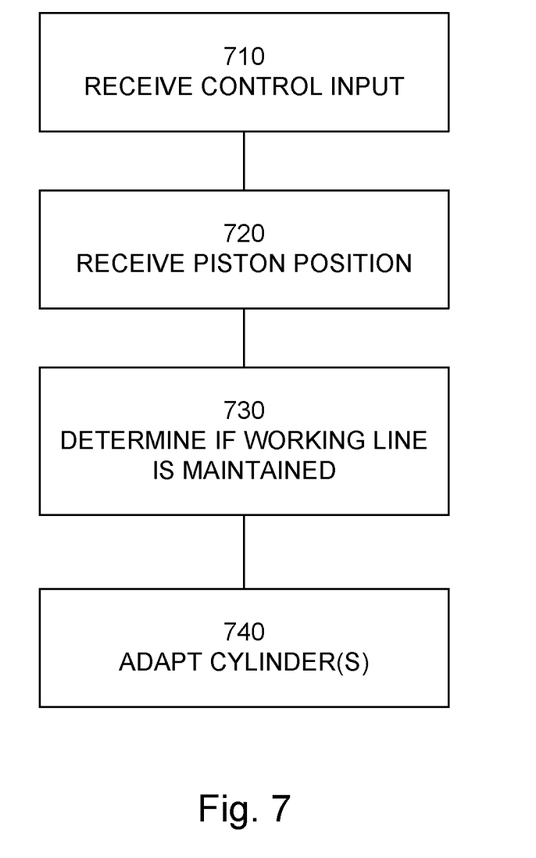
FIG. 7 shows a flowchart for a general method according to an embodiment of the teachings herein.

FIG. 7 shows a flowchart for a general method according to herein. The controller receives control input 710 for moving or feeding the tool 11*b*, which ensures that an operator is actively controlling the tool.

In one embodiment, the control input is given as a specific command to move the tool 11*b* in a direction along the working line. This enables an operator to simply give a command to feed (or retract) the tool along the working line.

In one embodiment, the control input is given by actuating a cylinder for moving the tool, such as for manually feeding the tool in the general direction of the working line. This allows for an operator's commands to be compensated, to enable the operator to fed the tool along the working line.

The controller then receives piston position information for at least a first piston or cylinder 720 and determines a new angle (a) and direction for the tool 11*b* based on the piston position information. The controller may also receive piston position information for a second cylinder. Based on the position information, the controller determines 730 whether the working line is maintained, and if not, the controller compensates or adapts 740 the movement of the tool so that the working line 11*b* is maintained. The adaptation or compensation may be made preemptively to ensure that the working line is maintained by providing control information to move or feed the tool 11*b* along the working line WL, especially in the embodiment where a specific command to feed the tool is received.

The invention has mainly been described above with reference to a few embodiments. However, as is readily appreciated by a person skilled in the art, other embodiments than the ones disclosed above are equally possible within the scope of the invention, as defined by the appended patent claims.

It is thereby appreciated that when in the present disclosure is referred to a "first" and a "second" hydraulic cylinder or a "first" and a "second" arm member this is done in order to differentiate one hydraulic cylinder or arm member of the carrier from another hydraulic cylinder or arm member of the carrier. it is further contemplated that anyone or all of the hydraulic cylinders comprised in the arm of the carrier may comprise a piston position sensor. Therefore, in accordance with the embodiments described above it also possible to adapt for the movement of anyone of the hydraulic cylinders comprised in the arm of the carrier by providing control of anyone of the other hydraulic cylinders comprised in the arm of the carrier.

The invention claimed is:

1. A carrier comprising a controller, at least a first hydraulic cylinder and a second hydraulic cylinder both having each a piston and a piston position sensor, wherein the carrier is arranged to carry a tool via the first and second hydraulic cylinders and wherein the controller is configured to:
   receive control information for controlling at least one of the first and the second hydraulic cylinder to move the tool in a direction along a working line;
   receive position information for the first hydraulic cylinder;
   receive position information for the second hydraulic cylinder;
   determine if the working line for the tool is maintained, and if the working line is not maintained then
   adapt for movement of said at least one of the first and the second hydraulic cylinder by providing control of at least the other of the first and the second hydraulic cylinder to maintain the working line for the tool and thereby feeding the tool along the working line.

2. The carrier according to claim 1, wherein the controller is further configured to receive control information for moving the tool in a direction along the working line based on input commands from a specified command control for moving the tool in a direction along the working line, the command control being comprised in the carrier.

3. The carrier according to claim 1, wherein the carrier comprises at least one control and wherein the controller is further configured to receive a command to set the working line, and in response thereto store the working line to be maintained, wherein the command to set the working line is a specific command through one of the controls whereby the controller would set a current working line as the working line to be maintained.

4. The carrier according to claim 1, wherein the carrier comprises at least one control and wherein the controller is further configured to receive a command to set the working line, and in response thereto store the working line to be maintained, wherein the command to set the working line is a command through one of the controls to select between previously stored working lines whereby the controller would set the working line to be maintained to a selected working line.

5. The carrier according to claim 4, wherein the controller is further configured to move the tool to the working line, the working line being defined by a height or distance to a reference, and a direction or an angle.

6. The carrier according to claim 1, wherein the controller is further configured to receive a command to set the working line, and in response thereto store the working line to be maintained, wherein the command to set the working line is a command to activate the operation of the tool, whereby the controller sets a current working line as the working line to be maintained.

7. The carrier according to claim 1, wherein the controller is further configured to determine a new working line to be maintained based on a previous working line to be maintained after the tool has been moved a distance, the new working line being parallel to the previous working line, but at the new position.

8. The carrier according to claim 7, wherein the controller is further configured to align the tool along the new working line, automatically or by guiding the operator.

9. The carrier according to claim 1, wherein the controller is further configured to receive an indication of a lean angle, and to manipulate the first or the second hydraulic cylinder accordingly for maintaining the working line.

10. The carrier according to claim 1, wherein, the carrier comprises an arm arranged to carry the tool and having a first arm member and second arm member, wherein the first hydraulic cylinder is arranged to move the first arm member and the second hydraulic cylinder is arranged to move the second arm member.

11. The carrier according to claim 10, wherein the second arm member is pivotally coupled to the first arm member.

12. The carrier according to claim 10, wherein the first arm is pivotally coupled to the carrier.

13. The carrier according to claim 10, wherein the first hydraulic cylinder is coupled to the first arm member and to the carrier.

14. The carrier according to claim 10, wherein the second hydraulic cylinder is coupled to second arm member and to the carrier.

15. A method for use in a carrier comprising at least a first hydraulic cylinder and a second hydraulic cylinder both having each a piston, a controller and a piston position sensor, wherein the carrier is arranged to carry a tool through the use of the hydraulic cylinders and wherein the method comprises:
- receiving control information for controlling at least one of the first and the second hydraulic cylinder to move the tool in a direction along a working line;
- receiving position information for the first hydraulic cylinder;
- receiving position information for the second hydraulic cylinder;
- determining if the working line for the tool is maintained, and if the working line is not maintained, then
- adapting for the movement of said at least one of the first and the second hydraulic cylinder by providing control of at least the other of the first and the second hydraulic cylinder to maintain the working line for the tool and thereby feeding the tool along the working line.

* * * * *